United States Patent
Mayfield et al.

(10) Patent No.: US 8,565,984 B2
(45) Date of Patent: Oct. 22, 2013

(54) SYSTEM AND METHOD OF STEERING FOR A WORK VEHICLE TOWING A TOWED IMPLEMENT ON LATERAL SLOPES

(75) Inventors: Robert Lynn Mayfield, Cedar Falls, IA (US); Andrew Karl Wilhem Rekow, Cedar Falls, IA (US)

(73) Assignee: Deere & Comany, Moline, IL (US)

( * ) Notice: Subject to any disclaimer, the term of this patent is extended or adjusted under 35 U.S.C. 154(b) by 1740 days.

(21) Appl. No.: 11/686,990

(22) Filed: Mar. 16, 2007

(65) Prior Publication Data
US 2008/0228353 A1 Sep. 18, 2008

(51) Int. Cl.
G03F 7/70 (2006.01)
G06G 7/00 (2006.01)
G06G 7/76 (2006.01)

(52) U.S. Cl.
USPC ...... 701/50; 701/1; 701/23; 701/26; 701/400; 701/408; 701/412; 701/448; 701/449; 701/468; 701/470; 701/472; 701/473; 701/494; 701/495

(58) Field of Classification Search
None
See application file for complete search history.

(56) References Cited

U.S. PATENT DOCUMENTS

| | | | |
|---|---|---|---|
| 3,946,825 A * | 3/1976 | Gail | 180/401 |
| 4,144,571 A * | 3/1979 | Webber | 701/217 |
| 5,922,036 A * | 7/1999 | Yasui et al. | 701/28 |
| 5,945,917 A * | 8/1999 | Harry | 340/815.45 |
| 5,987,383 A * | 11/1999 | Keller et al. | 701/213 |
| 5,995,895 A * | 11/1999 | Watt et al. | 701/50 |
| 6,041,582 A * | 3/2000 | Tiede et al. | 56/10.2 A |
| 6,070,673 A | 6/2000 | Wendte | |
| 6,112,144 A * | 8/2000 | Allen | 701/50 |
| 6,377,889 B1 | 4/2002 | Soest | |
| 6,434,462 B1 * | 8/2002 | Bevly et al. | 701/50 |
| 6,445,983 B1 | 9/2002 | Dickson et al. | |
| 6,446,003 B1 | 9/2002 | Green et al. | |
| 6,463,374 B1 * | 10/2002 | Keller et al. | 701/50 |
| 6,501,422 B1 * | 12/2002 | Nichols | 342/357.17 |
| 6,539,303 B2 * | 3/2003 | McClure et al. | 701/213 |
| 6,615,569 B1 | 9/2003 | Carlz | |
| 6,643,576 B1 | 11/2003 | O Connor et al. | |
| 6,694,260 B1 | 2/2004 | Rekow | |
| 6,711,501 B2 * | 3/2004 | McClure et al. | 701/213 |
| 6,789,014 B1 | 9/2004 | Rekow et al. | |
| 6,804,587 B1 | 10/2004 | O Connor et al. | |
| 6,819,780 B2 | 11/2004 | Benson et al. | |
| 7,142,956 B2 * | 11/2006 | Heiniger et al. | 701/23 |
| 7,162,348 B2 * | 1/2007 | McClure et al. | 701/50 |

(Continued)

FOREIGN PATENT DOCUMENTS

| | | |
|---|---|---|
| CA | 2427416 | 11/2004 |
| EP | 1 444 879 A1 | 8/2004 |
| EP | 1 688 027 A1 | 8/2006 |

*Primary Examiner* — Bhavesh V Amin

(57) ABSTRACT

A steering system for a work vehicle towing a towed implement is described. A steering control unit is coupled to a location signal generation arrangement on the vehicle, a steering actuator, a memory for storing desired path data of the implement and a slope sensor for detecting a lateral inclination of the work vehicle or the implement. The steering control unit calculates a lateral offset compensation value to steer the work vehicle such that the implement is moved on the desired path and a slope offset compensation value based upon a signal from the tilt sensor to compensate for slope forces pulling the implement down a lateral slope. A steering signal is sent to the steering actuator based upon the lateral offset compensation value and the slope offset compensation value.

16 Claims, 3 Drawing Sheets

(56) References Cited

U.S. PATENT DOCUMENTS

| | | |
|---|---|---|
| 7,844,378 B2 | 11/2010 | Lange |
| 2003/0187560 A1 | 10/2003 | Keller et al. |
| 2003/0187577 A1* | 10/2003 | McClure et al. .............. 701/213 |
| 2004/0124605 A1 | 7/2004 | McClure et al. |
| 2004/0186441 A1 | 9/2004 | Graf et al. |
| 2004/0186644 A1* | 9/2004 | McClure et al. ................ 701/50 |
| 2004/0217575 A1 | 11/2004 | Beaujot et al. |
| 2005/0096802 A1 | 5/2005 | Han et al. |
| 2006/0178825 A1* | 8/2006 | Eglington et al. ............ 701/211 |
| 2008/0004778 A1 | 1/2008 | Rekow |
| 2010/0063734 A1* | 3/2010 | Kumar .......................... 701/300 |

\* cited by examiner

SYSTEM AND METHOD OF STEERING FOR A WORK VEHICLE TOWING A TOWED IMPLEMENT ON LATERAL SLOPES

FIELD OF THE INVENTION

The present invention relates to automatic steering of work vehicles, in particular agricultural vehicles with towed implements.

BACKGROUND OF THE INVENTION

A shortcoming of global positioning system (GPS) based navigation and steering control systems used in agricultural ground vehicles is that the global positioning system receiver of such systems can only determine the position of the global positioning system antenna. On most ground vehicles, the mounting location for the global positioning system antenna is constrained by the requirement that a clear view of the sky, and thus the global positioning system satellites, be provided to the antenna.

When a work vehicle, like an agricultural tractor, pulls an implement over a field, and an automatic steering system is provided, the antenna of the location signal generation arrangement for providing location data of the actual position to the steering system is usually located on the vehicle. The vehicle is automatically steered in a manner such that the implement is moved on an intended path. The offset between the antenna and the implement can be compensated for by algorithms taking the geometry and kinematics of the tractor/implement combination into account. In this context, reference is made to U.S. Pat. No. 6,434,462.

If only the intended path of the implement and the actual position of the towing vehicle are considered for calculating steering signals for a steering actuator of the vehicle, and the implement and vehicle are moving on laterally inclined ground, possible deviations of the implement from the intended path may be caused by the lateral forces pulling the implement downhill.

It has been proposed to sense the lateral inclination and control steerable wheels of the implement to automatically compensate for the lateral inclination (U.S. Pat. No. 7,147,241), or to control a laterally movable hitch of a tractor dependent on a sensed lateral slope inclination, such that the implement stays on the intended path even on laterally sloped surfaces (U.S. Pat. No. 7,162,348). In both proposals, the tractor is provided with a GPS antenna and steered automatically or by an operator based upon a display in a manner such that the tractor remains on the intended path. These solutions require additional actuators for the steerable wheels of the implement or the movable hitch.

Further, it has been proposed to detect the lateral inclination of a tractor to apply lateral offset compensation to the location data based upon the signal from the inclination sensor (U.S. Pat. Nos. 6,501,422 and 6,694,260, US Patent Publication No. 2004/0186644, and European Patent Application EP 1 444 879). This lateral offset compensation takes the lateral movement of the antenna of the location signal generation arrangement with respect to the ground below the vehicle due to the lateral slope into account, but not the gravity forces moving the implement downhill, and can thus not compensate the latter.

Finally, it has been proposed to sense the lateral inclination of the vehicle and to consider the inclination in a determination of steering signals for automatic steering to keep the vehicle on an intended path on a lateral sloped terrain (European Patent Application 1 688 027, and U.S. Pat. No. 3,946,825), with the inclination value being derived from a topographical database (US Patent Publication No. 2005/0096802). These prior art documents only compensate for forces acting on the vehicle, but not on a towed implement.

Thus, there is a need for a reliable system for automatically steering a combination of a work vehicle and a towed implement compensating gravity forces acting onto the implement on lateral slopes.

It is an object of the present invention to provide a simple and reliable system for automatically steering a combination of a work vehicle and a towed implement that is able to steer the tractor in manner such that the implement keeps on the desired path even on terrain with lateral slopes.

SUMMARY OF THE INVENTION

A steering system, a work vehicle and a method for automatically steering a work vehicle towing an implement are proposed. The steering system comprises a location signal generation arrangement for providing location data of the position of the vehicle in a field. Desired path data representing a desired path of the implement over the field are stored in memory. The desired path can be straight or curved or a combination of straight and curved sections. A slope data provision arrangement provides a lateral inclination value of at least one of the work vehicle or the implement. A steering control unit is coupled to the location signal generation arrangement, the memory and the slope data provision arrangement and provides steering data.

During operation, the steering control unit calculates a lateral offset compensation value based upon the location data from the location signal generation arrangement and the desired path data from memory. This lateral offset compensation value is calculated such that the work vehicle would be steered using this value in a manner such that the implement is moved on the desired path. The lateral compensation offset value takes a possible lateral deviation between the position sensed by the location signal generation arrangement and the desired path into account, as well as a possible curvature of the path and the geometry and kinematics of the tractor/implement combination. Reference is made to U.S. Pat. Application Ser. No. 11/479605, the disclosure of which incorporated herein by reference. The steering control unit further calculates a slope offset compensation value based upon the lateral inclination value from the slope data provision arrangement. The slope offset compensation value compensates for gravity forces pulling the implement down a lateral slope. A steering signal is based upon the lateral offset compensation value and the slope offset compensation value.

In a preferred embodiment, a steering actuator is provided to control the propelling direction of the work vehicle that receives a steering signal from the steering control unit. The steering actuator can control the steering angle of steerable wheels of the vehicle or the speed of tracks of a tracked vehicle, which are driven with different speeds to perform a steering operation. In another embodiment, a display unit receives the steering signal and displays to an operator in which direction he or she should steer.

The location signal generation arrangement preferably comprises an antenna for receiving signals from a satellite based location system like the Global Positioning System (GPS), Glonass or Galileo, and/or a local sensor interacting with features of the field, like rows that may consist of cut crop or standing crop or edges between cut and uncut crop or raised dams on the field. The local sensor can be a mechanical feeler, an ultrasonic or optical distance sensor, a runtime based laser scanner, a camera with an image processing system, or some other arrangement of one or more sensors.

The slope data provision arrangement preferably comprises a slope sensor detecting a lateral inclination of the work vehicle and/or the implement. In another embodiment, a lateral slope value is derived from a topographical database based upon the location signal.

These and other objects, features and advantages of the present invention will become apparent to one skilled in the art upon reading the following detailed description in view of the drawings.

DESCRIPTION OF THE PREFERRED EMBODIMENT

Figure 1:
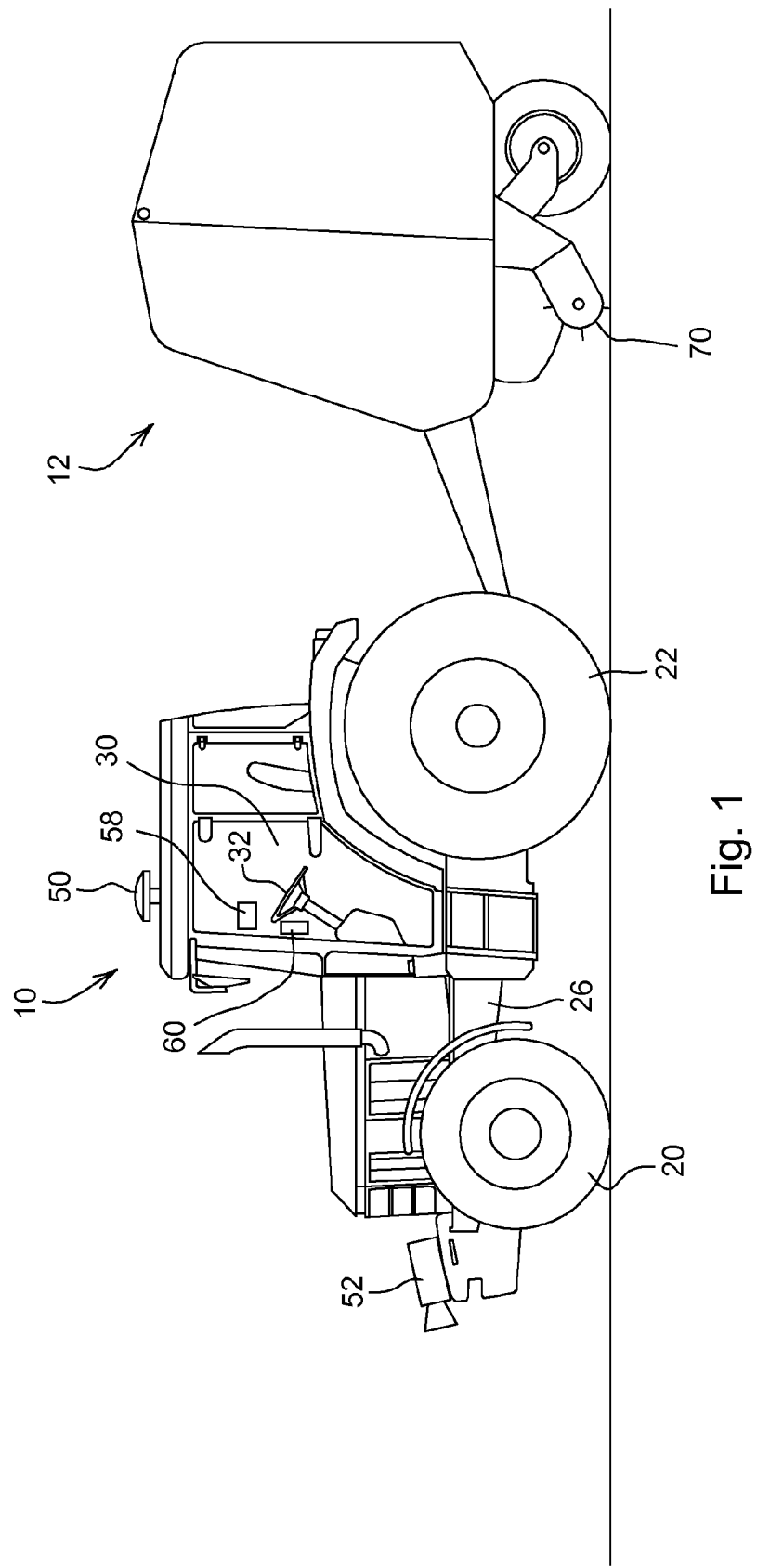
FIG. 1 is a side view of a work vehicle with towing an implement.

In FIG. 1, a side view of a self propelled work vehicle 10 in the form of a tractor and an implement 12 towed by the tractor is shown. In this example, the implement 12 is a round baler; however, it can be appreciated that any one of a variety of agricultural implements can be used. The vehicle 10 comprises a frame 26 supported on steerable front wheels 20 and driven rear wheels 22. In a cab 30 on the frame 26, a steering wheel 32 is provided.

Figure 2:
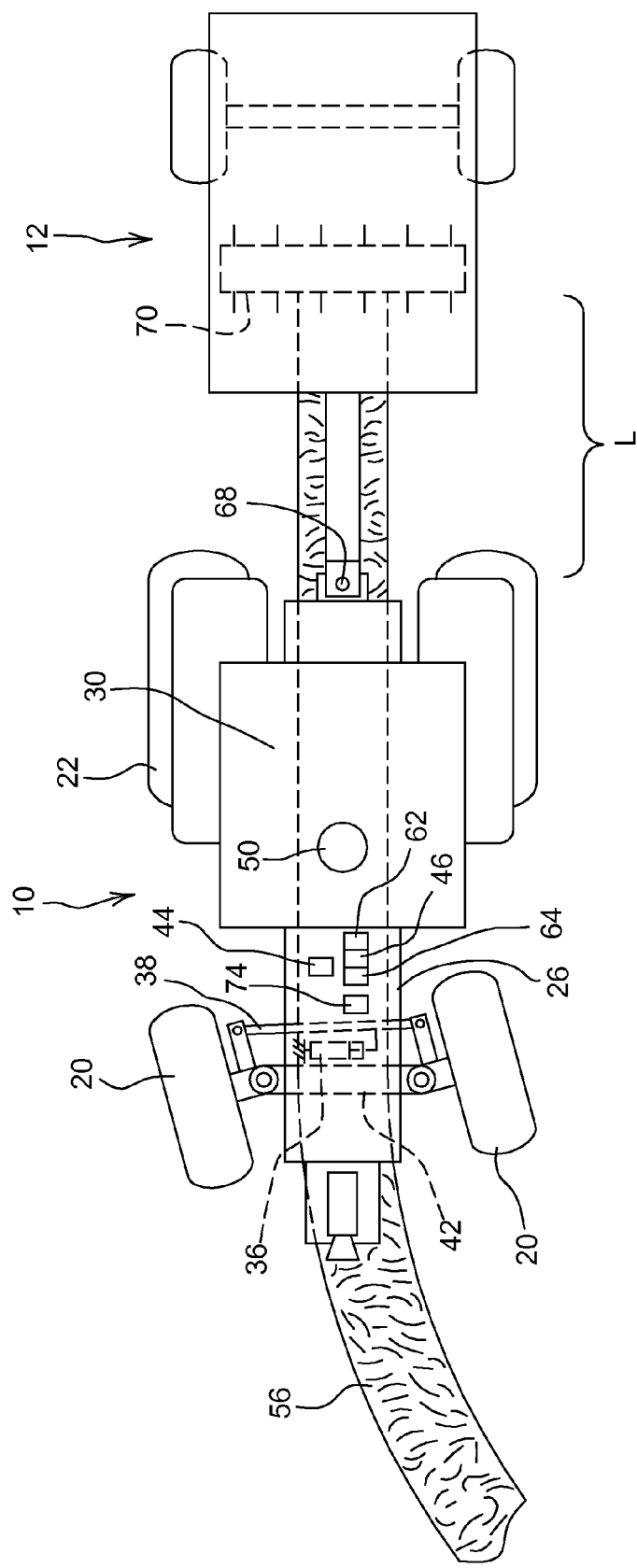
FIG. 2 is a schematic top view of the work vehicle and implement of FIG. 1.

In the top view of FIG. 2, a steering actuator 36 in the form of a hydraulic cylinder is mounted between the frame 26 and a steering rod 38 connecting to the front wheels 20. The front wheels 20 are pivotally supported on a front axle 42 around a vertical rotation axis. The steering actuator 36 can thus define the forward direction of the vehicle 10.

Steering actuator 36 is connected to an electromagnetic valve assembly 44, which is electrically connected to a steering controller 46. The steering controller 46 is additionally connected to a first location signal generation arrangement 50 in the form of an antenna receiving signals from a satellite positioning system that is mounted upon the roof of the cab 30. In this arrangement, the steering controller 46 is also connected to a second location signal generation arrangement 52 in the form of an electronic video camera mounted at the front of the vehicle 10. The second location signal generation arrangement 52 comprises an image processing system recognizing the location of a grain swath 56 on the field. Steering controller 46 is further connected to a display 58 in the cab 30 and to a user interface 60. The user interface 60 in this arrangement comprises a keyboard and switches.

The steering controller 46 holds desired path data representing a desired path of the implement 12 over the field in an electronic memory device (memory). The path data comprises straight and curved segments and have been collected during the previous operations on the field. The desired path data corresponds in this example to the position of the swath 56.

The steering control unit 46 is further electronically connected to a slope data provision arrangement in the form of a slope sensor 64 providing a lateral inclination value (sometimes referred to as a roll angle or tilt angle) of the work vehicle 10. The slope sensor 64 can comprise a pendulum connected to a potentiometer, or a gyroscope, or any other suitable sensor. The slope angle is also named roll angle or tilt angle.

Figure 3:
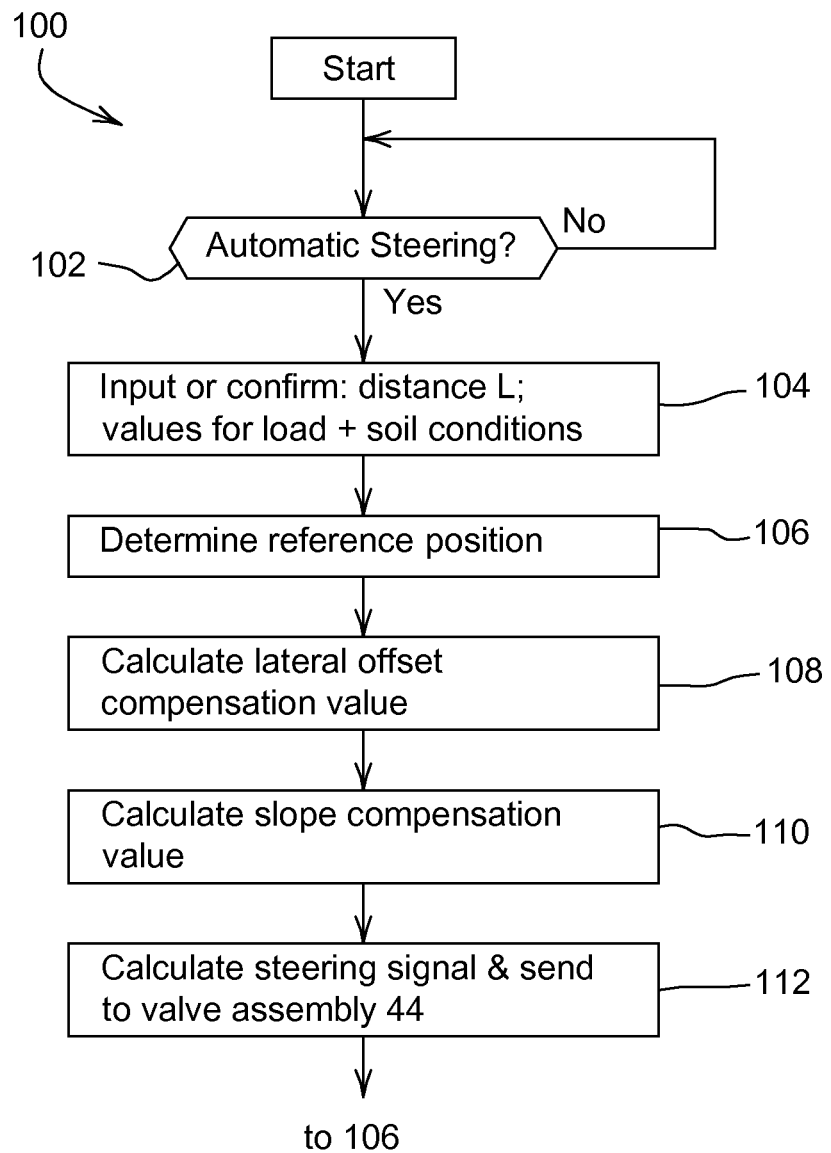
FIG. 3 is a flow diagram according to which the steering controller of the vehicle shown in FIG. 1 operates.

During operation, the steering controller 46 proceeds according to the flow diagram 100 of FIG. 3. In step 102 the steering controller 46 inquires whether the operator has selected an automatic steering mode (by means of the user interface 60). If no automatic steering mode was selected, the steering controller begins the flow diagram again. Automatic steering is also automatically stopped if the operator rotates the steering wheel 32. During manual steering, signals from a sensor (not shown) detecting the rotational position of the steering wheel 32 are sent to valve assembly 44 from the steering control unit 46.

If automatic steering was selected, then in step 104 the operator is asked to input a value for length L that corresponds to the distance between a hitch point 68 at the rear of the work vehicle 10 and an active portion 70 of the implement 12, which in this embodiment is the pick-up of the baler. Further, the operator is asked to input information on soil and load conditions. Thus, the operator can input an estimated value for the weight of the implement and a select a type of soil condition, for example between dry, wet and extremely wet. It would also be possible to start with default, average values for load and soil conditions and let the operator input later, during operation, whether the steering reaction (gain) on a lateral slope is appropriate or should be increased or decreased. If values have already been inputted during a previous operation, the operator can simply confirm them.

In step 106, the actual position of a reference point is calculated using the signal from the first location signal generation arrangement 50. This reference point can be a position at ground level below the first location signal generation arrangement 50, or the center of the active portion 70 of the implement 12, or any other suitable point. For this position calculation, the signals from the slope sensor 64 are taken into account, since the lateral offset between the first location signal generation arrangement 50 and the reference point due to a lateral slope may need to be considered. Likewise, if a pitch angle sensor is provided (not shown), sensing an angle between the horizontal plane and the longitudinal axis of vehicle 10, the pitch angle can be used for converting the position data from the first location signal generation arrangement 50 into the reference position. It should be noted that the signals from the second location signal generation arrangement 52 can be used instead of the signals from the first location signal generation arrangement 50 if the signal quality of the latter is not sufficient, or can also be used to improve the accuracy of the latter. In another embodiment, only the signals from the second location signal generation arrangement 52 can be used in step 106.

In the next step 108, a lateral offset compensation value is calculated based upon the actual position of the reference point from step 106 and the desired path data from memory. This lateral offset compensation value is calculated such that the work vehicle 10 would be steered using this value in a manner such that the implement 12 (in particular the active portion 70 thereof) is moved on the desired, stored path. The lateral compensation offset value takes a possible lateral deviation between the actual position of the reference point from step 106 and the desired path into account, as well as a possible curvature of the path and the geometry and kinematics of the tractor/implement combination, including the length L input in step 104. This calculation can be performed in the manner described in U.S. patent application Ser. No. 11/479605, the disclosure of which is incorporated herein by reference. Step 108 calculates the lateral offset compensation value for a vehicle/implement combination in a horizontal plane.

To compensate for lateral forces pulling the implement 12 down a lateral slope, in step 110, a slope compensation value is calculated. This slope compensation value depends on the slope angle measured with the slope sensor 64, the length L from step 104 and the values for the load and soil conditions, also from step 104. In a possible embodiment, a constant c is derived from the values for the load and soil conditions (or directly input via operator interface 60), and multiplied with L and the sine of the slope angle. Step 110 thus provides data for steering the vehicle 10 so far uphill such that the forces pulling the implement 12 downhill are compensated. Since the slope sensor 64 is mounted on the vehicle 10, lateral slopes are detected sufficiently early such that they can be compensated by automatically steering the vehicle 10 sufficiently uphill. In another embodiment, the slope sensor 64 could alternatively or additionally be provided on the implement 12.

In step 112, the lateral offset compensation value from step 108 and the slope compensation value from step 110 are used to calculate a steering signal, which is then sent to the valve assembly 44. In step 112, a value from an actual steering angle sensor 74 sensing the actual steering angle of the front wheels 20 can also be used for determining the steering signal. In one possible embodiment, the lateral offset compensation value from step 108 and the slope compensation value from step 110 are added to calculate a required lateral offset from the actual position, and therefrom a desired angle of the front wheels 20 is calculated, and thus the steering actuator 36 is moved until the steering angle measured with the actual steering angle sensor 74 corresponds to the desired angle of the front wheels 20. Finally, step 106 follows again.

Instead of sending the steering signal to valve assembly 44, the steering signal can be displayed on display 58, allowing the operator to steer the vehicle 10 manually according to the displayed values using the steering wheel 32. In this embodiment, the display 58 may be in the form of a lightbar or other visual indicator.

Having described the preferred embodiment, it will become apparent that various modifications can be made without departing from the scope of the invention as defined in the accompanying claims.

The following is claimed:

1. A steering system for a work vehicle towing a towed implement, comprising:
   a location signal generation arrangement for providing location data of the position of the vehicle in a field,
   a memory device for storing data representing a desired path of the implement over the field,
   a slope data provision arrangement providing a lateral inclination value of at least one of the work vehicle and the implement, and
   a steering control unit coupled to the location signal generation arrangement, the memory and the slope data provision arrangement, wherein the steering control unit is operable to calculate
      a lateral offset compensation value based upon the location data from the location signal generation arrangement and the desired path data from the memory, the lateral offset compensation value calculated to steer the work vehicle such that the implement is moved on the desired path,
      a slope offset compensation value based upon a signal from the slope data provision arrangement, the slope offset compensation value calculated based on an estimated weight or load of the implement to compensate for slope forces pulling the implement down a lateral slope,
      and a steering signal based upon the lateral offset compensation value and the slope offset compensation value.

2. A steering system according to claim 1, wherein the steering control unit sends the steering signal to at least one of a display and a steering actuator operable to control a propelling direction of the work vehicle.

3. A steering system according to claim 1, wherein the steering control unit is operable to calculate the slope offset compensation value based upon a forward distance between an active portion of the implement and a hitch of the work vehicle.

4. A steering system according to claim 3, wherein the steering control unit is coupled to a user interface for inputting a distance value representing the distance between an active portion of the implement and a hitch of the work vehicle.

5. A steering system according to claim 4, wherein the steering control unit is operable to calculate the lateral offset compensation value using the input distance value.

6. A steering system according to claim 1, wherein the steering control unit is operable to calculate the slope offset compensation value based upon a value representing at least one of implement load and soil conditions.

7. A steering system according to claim 6, wherein the steering control unit is coupled to a user interface for inputting a value representing at least one of implement load and soil conditions.

8. A steering system according to claim 1, wherein the steering control unit is operable to calculate the steering signal for the steering actuator based upon a sum of the lateral offset compensation value and the slope offset compensation value.

9. A steering system according to claim 1, wherein the steering control unit is operable to apply a lateral offset compensation to the location data based upon the signal from the slope data provision arrangement.

10. A steering system according to claim 1, wherein the location signal generation arrangement is operable to receive signals from a satellite based positioning system.

11. A steering system according to claim 1, wherein the location signal generation arrangement is operable to sense rows upon a field.

12. A steering system according to claim 1, wherein the desired path data contain at least one of straight and curved path segments.

13. A steering system according to claim 1, wherein the slope data provision arrangement comprises at least one of a slope sensor and a topographical database from which slope values are derived based upon the location data.

14. A work vehicle having a towed implement, comprising:
   a location signal generation arrangement for providing location data of the position of the vehicle in a field,
   a memory device for storing desired path data representing a desired path of the implement over the field,
   a slope data provision arrangement providing a lateral inclination value of at least one of the work vehicle and the implement,
   a steering control unit coupled to the location signal generation arrangement, the memory and the slope sensor, wherein the steering control unit is operable to calculate
      a lateral offset compensation value based upon the location data from the location signal generation arrangement and the desired path data from the memory, the lateral offset compensation value calculated to steer the work vehicle such that the implement is moved on the desired path, a slope offset compensation value based upon a signal from the slope data provision arrangement, the slope offset compensation value calculated based on an estimated weight or load of the implement to compensate for slope forces pulling the implement down a lateral slope, and a steering signal based upon the lateral offset compensation value and the slope offset compensation value.

15. A method of steering a work vehicle towing a towed implement, comprising:

storing desired path data representing a desired path of the implement over a field, providing location data of the position of the vehicle in the field, providing a lateral inclination value of at least one of the work vehicle and the implement, calculating a lateral offset compensation value based upon the location data and the desired path data to steer the work vehicle such that the implement is moved on the desired path, calculating a slope offset compensation value based upon the lateral inclination value and an estimated weight or load of the implement to compensate for slope forces pulling the implement down a lateral slope, and calculating a steering signal based upon the lateral offset compensation value and the slope offset compensation value.

16. A steering system for a work vehicle towing a towed implement, comprising:

a location signal generation arrangement for providing location data of the position of the vehicle in a field, a memory device for storing data representing a desired path of the implement over the field, a slope data provision arrangement providing a lateral inclination value of at least one of the work vehicle and the implement, and a steering control unit coupled to the location signal generation arrangement, the memory and the slope data provision arrangement, wherein the steering control unit is operable to calculate a lateral offset compensation value based upon the location data from the location signal generation arrangement and the desired path data from the memory, the lateral offset compensation value calculated to steer the work vehicle such that the implement is moved on the desired path, a slope offset compensation value based upon a signal from the slope data provision arrangement, the slope offset compensation value calculated based on a distance between an active portion of the implement and a hitch of the work vehicle to compensate for slope forces pulling the implement down a lateral slope, and a steering signal based upon the lateral offset compensation value and the slope offset compensation value.

* * * * *